J. A. F. BURMAN & P. W. LYTH.
HELIOGRAPH OR THE LIKE.
APPLICATION FILED SEPT. 29, 1914.
1,196,331.
Patented Aug. 29, 1916.
2 SHEETS—SHEET 1.
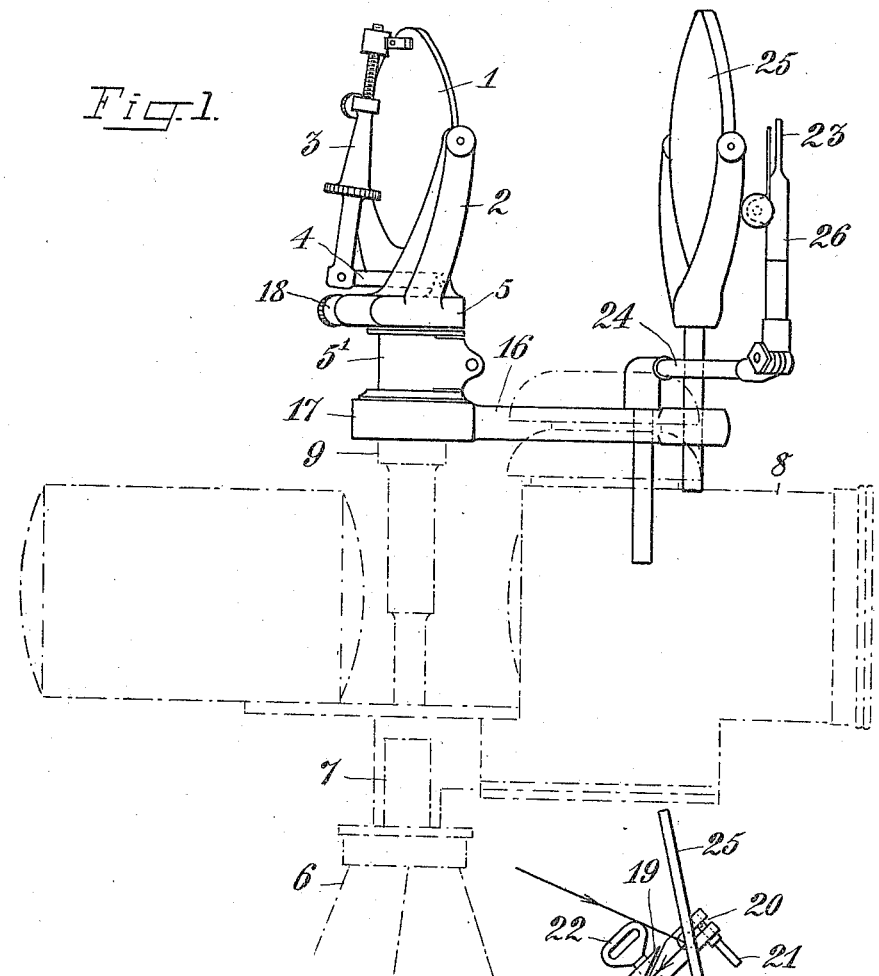
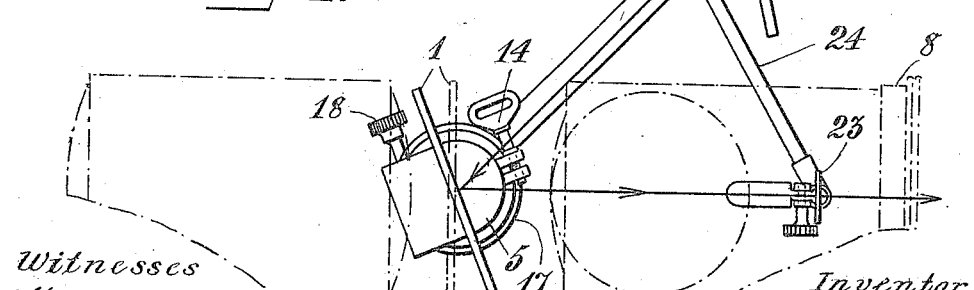

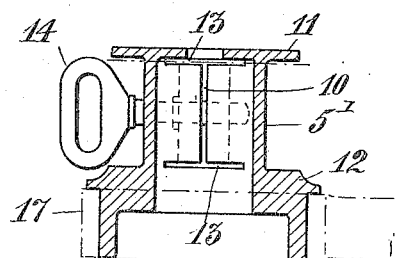
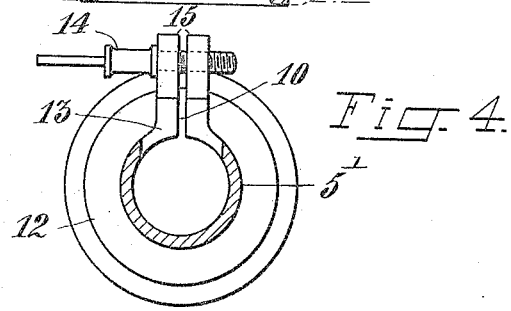
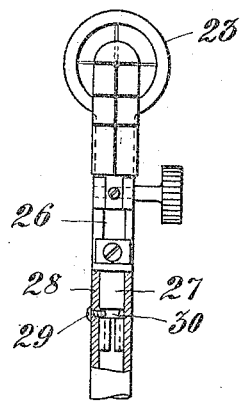

UNITED STATES PATENT OFFICE.

JOHN AUGUST FALE BURMAN AND PAUL WILHELM LYTH, OF STOCKHOLM, SWEDEN, ASSIGNORS TO AKTIEBOLAGET ARMÉMATERIAL, OF STOCKHOLM, SWEDEN, A CORPORATION OF SWEDEN.

HELIOGRAPH OR THE LIKE.

1,196,331.      Specification of Letters Patent.      Patented Aug. 29, 1916.

Application filed September 29, 1914. Serial No. 864,121.

*To all whom it may concern:*

Be it known that we, JOHN AUGUST FALE BURMAN and PAUL WILHELM LYTH, subjects of the King of Sweden, and both residents of Stockholm, Sweden, have invented new and useful Improvements in Heliographs or the like, of which the following is a specification, reference being had to the accompanying drawings, forming a part thereof.

The present invention relates to apparatus for sending light signals, so called heliographs, which consist chiefly of a signaling mirror, movable in such a manner that the light reflected therefrom will be visible or invisible according to different signals to be despatched, a sight cross for use when adjusting the signaling mirror and a duplex mirror for reflecting the light onto the signaling mirror when the light cannot be received directly by the signaling mirror.

The object of the present invention is to obtain a simple and handy apparatus, and to make it suitable for being applied upon such apparatus for light-signals with which it can coöperate advantageously, for instance, on signaling lanterns for sending light signals in the dark or in poor daylight. Such a combination has hitherto been connected with certain difficulties. For supporting the sight cross and the duplex mirror the heliograph has hitherto been provided with two sight arms projecting from the support of the signaling mirror or arranged so as to make the removing of the sight cross necessary in order to attach the duplex mirror or vice versa. When using two arms these have made the attaching of the heliograph difficult or in many cases impossible, since the cowl or projecting parts common on signaling lanterns prevent the placing and free swinging of the sight arms. The arrangement has also been rather complicated and lacking the stability and simplicity, which are necessary in instruments of this kind.

This invention has for its object the removing of said disadvantages.

The invention consists chiefly in supporting the sight cross and the duplex mirror by a common member preferably projecting from the support of the signaling lantern, for instance, by an arm projecting from the support. The heliograph arranged in such manner can easily be attached to a signaling lantern provided with a cowl without occupying much room neither horizontally nor vertically and the arrangement will have the smallest possible height and good stability and the heliograph can be swung freely and moved on the lantern so as to obtain a good alinement.

The invention also embodies a simple, reliable and easily adjusted device for attaching the heliograph either directly to a stand or to the top of a lantern.

In the accompanying drawings a constructional form of the invention is shown.

Figure 1 is a side view of the heliograph mounted on a signaling lantern. Fig. 2 is a plan view of the same. Fig. 3 is a sectional side view on a larger scale of a clamp for the signaling mirror of the heliograph. Fig. 4 is a plan view of the same. Fig. 5 shows an adjustable arm, for supporting the sight cross.

The signaling mirror 1 is pivoted in the fork 2 and has on its rear side a vertical screw 3 for adjusting the signaling mirror and for operating the same when telegraphing, for instance, by the Morse system. The said vertical screw 3 is pivoted on an arm 4 which in its turn is pivoted on the support of the mirror. Said support consists of an upper part 5 and a socket $5^1$. The upper part 5, which is not shown in Figs. 3 and 4, is mounted in said socket $5^1$ and provided with a screw 18 for fine adjustment of the position of the signaling mirror. Said socket $5^1$ (Figs. 3 and 4) embraces a pivot 7 on the stand 6 or a similar pivot 9 on the lantern. The socket $5^1$ has an axial slot 10 (Figs. 3 and 4) which slot, preferably, extends only between the two flanges 11 and 12. The vertical slot 10 may terminate in the two horizontal slots 13, 13 thus forming between them two resilient parts of the wall of the socket which can be locked by means of the screw 14 threaded through the lugs 15. The socket, split in this manner will be sufficiently resilient to be clamped to the pivot or loosened therefrom without losing anything in the strength and rigidity necessary for carrying the member supporting the sight cross and the duplex mirror. This member comprises in the present form a sight arm 16 which by means of an annular part 17 embraces the lower part of the socket 5¹. The arm 16 may thus be swung back and forth according to the desired adjustment. Close to the outer end the arm 16 has two apertures which together with corresponding slots 19 and 20 form clamps operated by screws 21 and 22. In one of these clamps, preferably the inner one, the arm 24 supporting the sight cross 23 is fastened. The duplex mirror 25 is inserted in the extreme clamp, when the use of it is desired. When the signaling mirror 1 receives the light straight from its front it has the position shown in dotted lines in Fig. 2.

In order to facilitate an alinement of the sight cross 23 the same is supported by an arm 26, or the like, which is mounted on a stud 27 embraced by the socket 26 and fastened by a screw 29 entering a groove 30 around the neck of the stud 27.

Having now described our invention, what we claim and desire to secure by Letters Patent is:

1. In an apparatus of the class described, the combination of a signaling mirror, a supporting stud for said mirror, a swingable arm mounted on said stud, a duplex mirror mounted on said arm, a second arm mounted on the first mentioned arm, and a sighting cross mounted on said second arm, substantially as and for the purpose set forth.

2. In an apparatus of the class described, the combination of a signaling mirror, a supporting stud for said mirror, a socket embracing said stud, a swingable arm mounted on said socket, a duplex mirror mounted on said arm, a second arm mounted on the first mentioned arm and a sighting cross mounted on said second arm, substantially as and for the purpose set forth.

3. In an apparatus of the class described, the combination of a signaling mirror, a supporting stud for said mirror, a socket provided with a vertical and two horizontal slots embracing said stud, a swingable arm mounted on said socket, a duplex mirror mounted on said arm, a second arm mounted on the first mentioned arm and a sighting cross mounted on said second arm, substantially as and for the purpose set forth.

4. In an apparatus of the class described, the combination of a signaling mirror, a supporting stud for said mirror, a swingable arm mounted on said stud and provided with two slotted apertures, a duplex mirror provided with a stud inserted in one of said apertures, a swingable arm provided with a pivot inserted in the other aperture, and a sighting cross mounted on said arm, substantially as and for the purpose set forth.

5. In an apparatus of the class described, the combination of a signaling mirror, a supporting stud for said mirror, a swingable arm mounted on said stud, a duplex mirror mounted on said arm, a second arm mounted on the first mentioned arm, a socket on said second arm, a sighting cross provided with a stud inserted in said socket and formed with a neck, and a screw threaded into said socket so as to engage the neck of the stud for securing the same in adjusted position of the sighting cross, substantially as and for the purpose set forth.

JOHN AUGUST FALE BURMAN.
PAUL WILHELM LYTH.

Witnesses:
KONR. DAHLQVIST,
MORD, GUSTAFSON.